Feb. 5, 1957 R. A. OWENS 2,780,318
SAFETY BLOCK
Filed Oct. 11, 1955
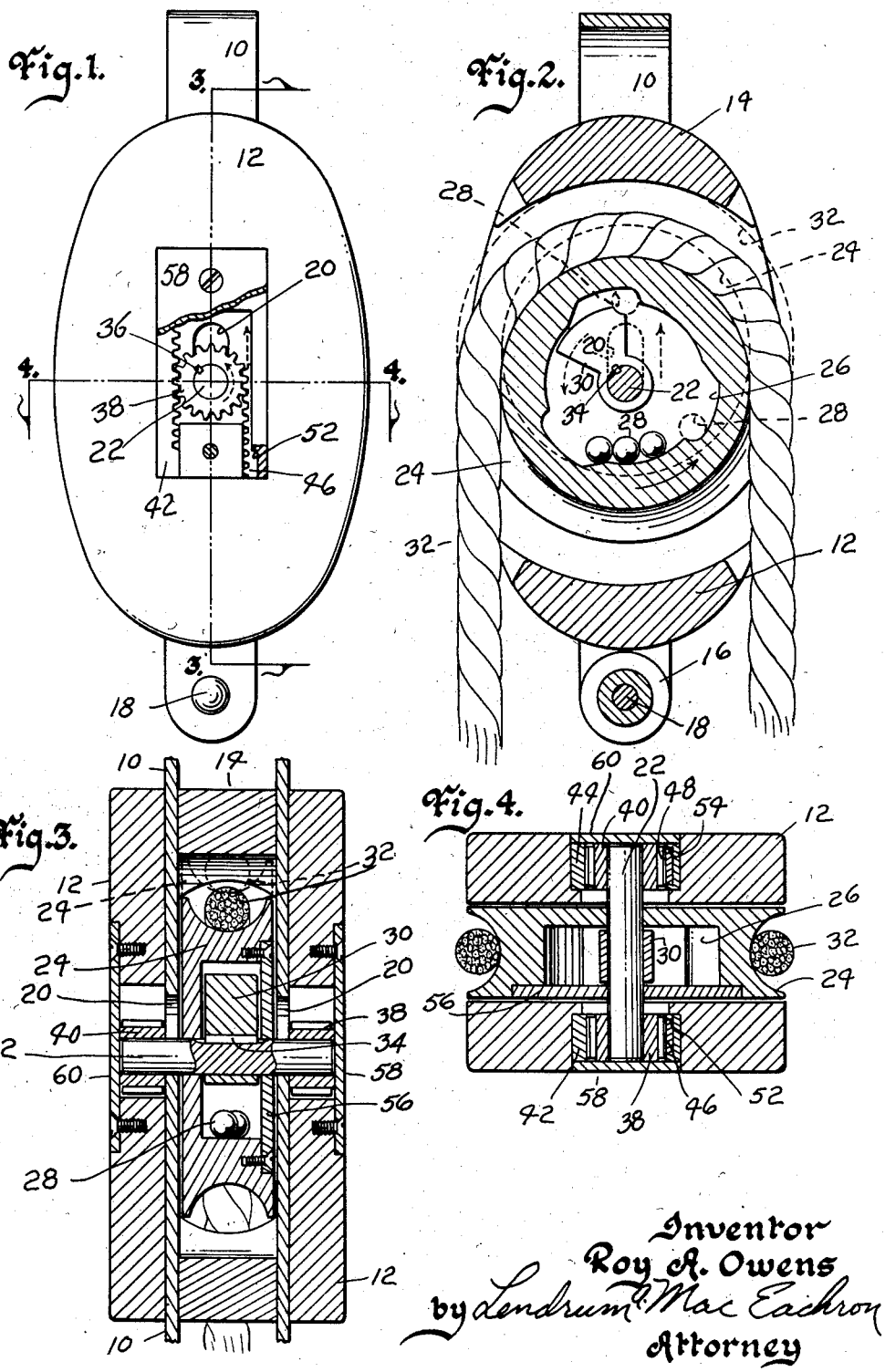
Inventor
Roy A. Owens
by Lendrum & MacEachron
Attorney

2,780,318
SAFETY BLOCK

Roy A. Owens, Des Moines, Iowa

Application October 11, 1955, Serial No. 539,737

10 Claims. (Cl. 188—65.1)

This invention is a novel safety block that features a centrifugal force triggered mechanism for moving the sheave thereof into clamping relationship with a fixed brake shoe on opposite sides of a rope or other flexible element running over the sheave. It also features a sealed mechanism which makes the safety action of the unit tamperproof. The triggering mechanism is mounted inside the sheave which is hollow. A rack and pinion assembly produce the motion of the sheave in response to rotation thereof at times to lock the rope between the sheave and a brake shoe. A sliding rack is a featured structure to keep the pinion in operative engagement with the fixed rack under heavy load.

Accordingly it is the main object of this invention to provide a novel safety block; one that:

1. Acts to brake the flexible element running over the sheave when sheave speed becomes excessive in at least one direction.
2. Grips the flexible element in a manner calculated to minimize wear and fraying of the flexible element.
3. Is tamperproof by personnel using it.
4. Increases braking action as tension on the flexible element increases after excessive sheave speed in one direction.
5. Is inexpensive and very dependable in operation.

While the foregoing specific objects are the main ones of my invention, it is my intention to include as objects any such as may be apparent to one skilled in this line of endeavor after he has read this specification and examined the accompanying drawings which are briefly described as follows:

Fig. 1 is a side elevation of the block with portions of it broken away to illustrate more fully its construction;

Fig. 2 is a vertical section; broken lines illustrate adjusted positions of parts illustrated in solid lines; dotted lines show hidden parts;

Fig. 3 is a different vertical section taken on the line 3—3 of Fig. 1; broken lines illustrate adjusted positions of parts illustrated in solid lines; and Fig. 4 is a cross section taken on the line 4—4 of Fig. 1.

Referring to the drawings, the invention is shown to consist of a conventional hanger 10 secured to block housing 12 that has a brake shoe 14 fixed in its top. Hanger 10 and the housing 12 are referred to below at times as the frame. The lower ends of the hanger are secured in a spaced relation to each other in a conventional manner with the spool spacer 16 and rivet 18. Hanger 10 has a pair of like slots 20 formed in it through which the axle 22 passes and is slidably secured to the frame thereby. Journalled on the axle is the hollow sheave 24 which has one or more internal peripheral troughs 26 for carrying one of the bearing balls 28 into contact with rotor arm 30. The bearings are carried around to make this contact only when centrifugal force resulting from pulley rotation is great enough to overcome the tendency of the bearings to fall to the bottom of the hollow sheave. A pulley speed that will produce the requisite centrifugal force has been set empirically at sixty feet per minute travel of the flexible element 32 over the pulley in a direction as indicated by the solid line arrow in Fig. 2. Speeds below this factor of sixty feet per minute are considered safe speeds. This speed can be altered to meet the specific requirements of some particular application. Rotor 30 is fixed to axle 22 in any suitable manner as by the key 34. Fixed to the ends of the axle by suitable keys such as the one 36 in Fig. 1 are the gears 38 and 40. These pinion gears engage the racks 42 and 44 which are fixed to the frame. When the load imposed on this track and pinion structure is great, there will be a tendency for the axle to be sprung permitting the rear and rack teeth to slip over each other. To avoid this difficulty in a relatively inexpensive manner I propose to place a pressure on the opposite side of the gear from the fixed racks 42 and 44. Sliding racks 46 and 48 are the most satisfactory means I have evolved for doing this. These two racks slide in the dovetailed slide ways 52 and 54. A plate 56 seals the interior of the pulley while the plates 58 and 60 cover the gear rack structures.

The device can be seen from Fig. 2 to be freely rotatable in one direction as troughs 26 are slanted on one end to permit the ball bearings 28 to escape from the trough even though held there by centrifugal force until encountered by the rotor 30. When the sheave is rotated rapidly in the other direction, however, as when the rope becomes accidentally disconnected from its anchoring point, the trough holds the ball against being dislodged by the rotor and instead acts to connect the rotor and sheave together for simultaneous rotation. This is illustrated by the broken lines in Figures 2 and 3. When the rotor is turned, the gears are rotated and climb racks 42 and 44. Axle 22 is moved upward by this interaction of the gears and racks which carries sheave 24 up toward brake shoe 14. Flexible element 32 is squeezed between the sheave and brake shoe 14, therefore, braking the movement of the flexible element. The greater the force on the flexible element, once the braking action has started, the harder flexible element is gripped. This is apparent, since the gripping results from rotation of the sheave. To release the brake action when the run-a-way or over speed condition of the flexible element 32 is rectified, the flexible element is pulled in a direction to rotate the sheave against the solid line arrow in Fig. 2. The ball 28 is released and falls by gravity to the bottom of the cavity in hollow sheave 24 which permits the rotor to resume a normal unlocked condition and rotate to drop axle 22 to the position shown in Figures 1, 2 and 3. Safe speed rotation of sheave 24 in the direction of the solid line arrow in Fig. 2 can then be resumed in turn.

I have disclosed my invention by both showing and describing a preferred though not exclusive practical embodiment of it, and I now point out particularly what I believe to be my invention in the following claims.

I claim:

1. In a safety block; a frame; an axle slideably mounted in said frame; a hollow sheave journalled on said axle; a brake shoe fixed to said frame near said sheave; fixed racks secured to said frame near the ends of said axle; gears engaging said racks and fixed to said axle; a rotor arm fixed to said axle and positioned within said hollow sheave; and means also in said hollow sheave operative under the influence of centrifugal force to connect said rotor to said sheave at a predetermined speed for said sheave.

2. The safety block of claim 1 in which there are sliding means secured to said frame engaging said gears urging them into contact with said rack.

3. The safety block of claim 2 in which said sliding means are sliding racks.

4. The safety block of claim 3 in which said hollow sheave has at least one internal peripheral trough and said means operative under the influence of centrifugal force are balls.

5. The safety block of claim 1 in which said hollow sheave has at least one internal peripheral trough and said means operative under the influence of centrifugal force are balls.

6. In a safety block; a frame; an axle sildeably mounted in said frame; a hollow sheave journalled on said axle; complementary centrifugal force actuated means secured to said axle within said hollow sheave and a portion of which is loose within said hollow sheave for connecting said axle to said sheave at times; complementary interacting means secured to said frame and said axle for producing sliding movement of said axle relative to said frame when said axle is rotated; and a brake shoe secured to said frame near said hollow sheave.

7. In a safety block as claimed in claim 6 in which the sliding movement of said axle is vertical and up in response to rotation of said axle resulting from the connection of said sheave and axle and rotation of said sheave.

8. The safety block of claim 6 in which said hollow sheave is sealed.

9. The safety block of claim 1 in which said hollow sheave is sealed.

10. In a block: a frame; an axle moveably secured to said frame; a sheave journalled on said axle; complementary means secured to said axle and said sheave for connecting them for simultaneous rotation at times of excessive sheave speed in one direction; complementary means secured to said axle and said frame producing relative movement therebetween when said axle is rotated; and a brake shoe secured to said frame near said sheave.

References Cited in the file of this patent

UNITED STATES PATENTS

| | | |
|---|---|---|
| 1,787,516 | Dubuque | Jan. 6, 1931 |
| 2,276,767 | Dubuque | Mar. 17, 1942 |